US011501359B1

United States Patent
Lorenz et al.

(10) Patent No.: US 11,501,359 B1
(45) Date of Patent: Nov. 15, 2022

(54) SYSTEM AND METHOD FOR FACILITATING SELECTIVE ORDER MODIFICATION

(71) Applicant: CoverMyMeds LLC, Columbus, OH (US)

(72) Inventors: Mark Lorenz, Columbus, OH (US); Dustin Eubanks, Columbus, OH (US); Jordan Hilsher, Columbus, OH (US); Brian Wyer, Columbus, OH (US); Frank Rosile, Columbus, OH (US); Corbin Shaw, Columbus, OH (US)

(73) Assignee: COVERMYMEDS LLC, Columbus, OH (US)

( * ) Notice: Subject to any disclaimer, the term of this patent is extended or adjusted under 35 U.S.C. 154(b) by 0 days.

(21) Appl. No.: 16/945,408

(22) Filed: Jul. 31, 2020

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0635* (2013.01); *G06Q 30/0283* (2013.01); *G06Q 30/0629* (2013.01)

(58) Field of Classification Search
None
See application file for complete search history.

(56) References Cited

U.S. PATENT DOCUMENTS 9,734,541 B1 * 8/2017 Pinsonneault ......... G16H 10/20
10,769,712 B1 * 9/2020 Edwards ............ G06Q 30/0635
(Continued)

FOREIGN PATENT DOCUMENTS

CA 2495018 C 6/2013
CA 2552056 C 6/2015
(Continued)

OTHER PUBLICATIONS

Elizabeth Seeley et al. "Competition, Consolidation, and Evolution in the Pharmacy Market" The Commonwealth Fund, Issue Briefs Aug. 12, 2021. Retrieved from https://www.commonwealthfund.org/publications/issue-briefs/2021/aug/competition-consolidation-evolution-pharmacy-market (Year: 2021).*

(Continued)

*Primary Examiner* — Naeem U Haq
(74) *Attorney, Agent, or Firm* — Alston & Bird LLP

(57) ABSTRACT

A system and method facilitate modification of an order including selection of a different supplier than the supplier originally designated to fill the order. The system includes a communication interface configured to receive an order identifying a product, a designated supplier and a price of the product. The system also includes a supplier database configured to store information for a plurality of suppliers. The system further includes processing circuitry configured to identify one or more alternative suppliers and the price of the product at the alternative suppliers based upon the information stored by the supplier database. The processing circuitry is also configured to cause information to be provided to a customer regarding the price of the product at the alternative suppliers. The processing circuitry is further configured, based on feedback from the customer that identifies a different supplier, to facilitate modification of the order to identify the different supplier.

17 Claims, 6 Drawing Sheets

(56) References Cited

U.S. PATENT DOCUMENTS

| | | | |
|---|---|---|---|
| 2004/0254843 A1* | 12/2004 | Koch | G06Q 30/02 705/26.81 |
| 2012/0016687 A1 | 1/2012 | Dhavle et al. | |
| 2013/0179177 A1 | 7/2013 | Dhavle et al. | |
| 2013/0232035 A1* | 9/2013 | Stijen | G06Q 20/102 705/26.81 |
| 2014/0039911 A1* | 2/2014 | Iyer | G06Q 30/0207 705/2 |
| 2014/0297437 A1* | 10/2014 | Natarajan | G06Q 30/0635 705/21 |
| 2016/0055314 A1 | 2/2016 | Anderson et al. | |
| 2016/0063626 A1* | 3/2016 | Axelrod | G06Q 50/06 705/37 |
| 2016/0188820 A1 | 6/2016 | Brown et al. | |
| 2016/0239827 A1* | 8/2016 | Reddy | G06Q 20/354 |
| 2017/0329921 A1 | 11/2017 | Willard et al. | |
| 2018/0240107 A1* | 8/2018 | Andrade | G06Q 20/36 |
| 2018/0293351 A1 | 10/2018 | Simons et al. | |
| 2019/0147400 A1* | 5/2019 | Knight | G06Q 10/0875 705/26.81 |

FOREIGN PATENT DOCUMENTS

| | | |
|---|---|---|
| CA | 2900718 A1 | 2/2016 |
| CA | 2552057 C | 8/2016 |
| WO | WO 2012/009513 A1 | 1/2012 |

OTHER PUBLICATIONS

Joey Mattingly "Understanding Drug Pricing" U.S. Pharmacist Jun. 20, 2012. Rertieved from https://www.uspharmacist.com/article/understanding-drug-pricing (Year: 2012).*

GoodRX, "How GoodRX Works", Oct. 20, 2013 to Aug. 7, 2020, Internet Archive https://www.goodrx.com/how-goodrx-works, 2 pages.

SingleCare, "How SingleCare Works", Mar. 13, 2018 to Apr. 27, 2019, Internet Archive https://web.archive.org/web/20180313010019/ https://www.singlecare.com/how-it-works, 4 pages.

Valent, "DrFirst Patent Text Notifications", retrieved from https://help.valant.com/79959-erx/drfirst-patient-text-notifications on Aug. 20, 2020, 4 pages.

* cited by examiner

New Prescription – Jane Doe

Apreretin 200MG tablets (30, once daily, no refills)

Formulary Alternatives (click to switch)
Abafribrate 100MG tablets - $25
Alfuxime 400MG tablets - $22

Prior authorization required
☐ Start PA

Prior authorization estimated cost from the Designated Pharmacy
$25.00

Cash Discount Price from the Designated Pharmacy
$14.00

☑ Lower cost options could be available. Send the prescription to the patient.

CREATE RX

Figure 6A

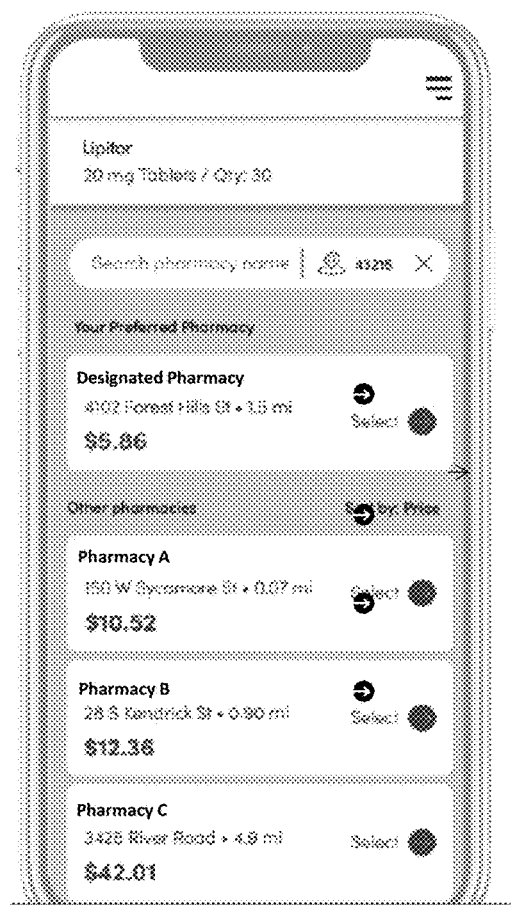

Figure 6B

SYSTEM AND METHOD FOR FACILITATING SELECTIVE ORDER MODIFICATION

TECHNOLOGICAL FIELD

An example embodiment relates generally to a system and method for facilitating selective order modification and, more particularly, to a system and method for facilitating modification of an order to identify a different supplier of a product than the supplier initially designated by the order.

BACKGROUND

In conjunction with an order placed for a product, a supplier of the product may be designated. The supplier of the product that is the subject of the order may be automatically defined based upon a prior selection by the customer, based upon an inference drawn from past behavior by the customer, based on a preference of the party that is formulating the order, or in some other manner.

In some instances, the same or a functionally equivalent product to the product that is the subject of the order may be obtained from a plurality of suppliers and the price of the product may vary from one supplier to another supplier. In these instances, some customers may determine that the same or a functionally equivalent product may be obtained from a different supplier than the supplier designated by the order and, in some of these instances, the customer may obtain the product, not from the supplier designated by the order, but from another supplier, such as another supplier offering the same or a functionally equivalent product for a lower price. In such instances, the supplier designated by the order may have received the order and filled the order and be awaiting a visit from the customer to retrieve the product that was ordered. However, as the customer has obtained the product from the other supplier, the customer will not retrieve the produce the supplier designated by the order and the supplier designated by the order will eventually have to restock the product in inventory.

This situation in which the customer obtains the product from a different supplier instead of the supplier designated by the order creates a number of inefficiencies. These inefficiencies include computing and network-based inefficiencies as a result of the exchange of messages between the party formulating the order and the supplier designated by the order via which the order is transmitted to the supplier designated by the order. As the customer selects a different supplier from which to obtain the product, this exchange of messages and the associated computing and network resources that are consumed by the exchange of messages proves to be unnecessary, but adds to the computing and network load. Additional inefficiencies are created for the supplier by the order that fills the order and then holds the filled order awaiting the customer before eventually having to restock the product due to the failure of the customer to arrive to retrieve the product that was ordered.

BRIEF SUMMARY

A system and method are provided in accordance with an example embodiment in order to facilitate modification of an order including selection of a different supplier than the supplier originally designated to fill the order. In this regard, the system and method of an example embodiment provide for modification of the order including selection of a different supplier prior to transmission of the order to the supplier that is originally designated. Thus, the system and method of an example embodiment provide for the fulfillment of an order in a more efficient manner by reducing or eliminating the exchange of messages between the party formulating and placing the order and the originally supplier designated by the order, thereby conserving computing and network resources. Moreover, the system and method of an example embodiment increase the efficiency with which a supplier operates by reducing or eliminating instances in which a supplier that is initially designated by an order fills the order and holds the filled order awaiting a visit from the customer, only to eventually have to restock the product in an instance in which the customer has identified a different supplier for the same or a functionally equivalent product.

In an example embodiment, a system is provided that is configured to facilitate selective order modification. The system includes a communication interface configured to receive an order identifying a product, a designated supplier from which the product is to be supplied and a price of the product at the designated supplier. The system also includes a supplier database configured to store information for a plurality of suppliers. The system further includes processing circuitry configured to identify one or more alternative suppliers and the price of the product at the one or more alternative suppliers based upon the information stored by the supplier database. The processing circuitry is also configured to cause information to be provided via the communication interface to a customer regarding the price of the product at the one or more alternative suppliers. Additionally, the system includes a pending order memory queue configured to at least temporarily store information regarding the order in conjunction with provision of the information to the customer regarding the price of the product at the one or more alternative suppliers. The processing circuitry of this example embodiment is further configured, based on feedback from the customer that identifies a different supplier selected from among the one or more alternative suppliers, to facilitate modification of the order to identify the different supplier selected from among the one or more alternative suppliers instead of the designated supplier.

The communication interface of an example embodiment is configured to receive the order by receiving the order prior to transmission of the order to the designated supplier. In an example embodiment, the pending order memory queue is configured to store information regarding a plurality of orders for a plurality of customers while awaiting the feedback from the respective customers. The system of an example embodiment also includes a timer configured to determine an elapsed time from provision of the information to the customer regarding the price of the product at the one or more alternative suppliers. The processing circuitry of this example embodiment is further configured to cause information regarding the order to be provided via the communication interface to the designated supplier in an instance in which the feedback from the customer is not received within a predefined period of time.

In an example embodiment, another system is provided that is configured to facilitate selective order modification. The system includes a communication interface configured to receive an order identifying a product, a designated supplier from which the order is to be supplied and a price of the product at the designated supplier. The system of this example embodiment includes processing circuitry configured to identify one or more alternative suppliers and the price of the product at the one or more alternative suppliers. The processing circuitry is also configured to cause information to be provided via the communication interface to a customer regarding the price of the product at the one or more alternative suppliers. Based on feedback from the customer that identifies a different supplier selected from among the one or more alternative suppliers, the processing circuitry is further configured to facilitate modification of the order to identify the different supplier selected from among the one or more alternative suppliers instead of the designated supplier.

The communication interface of an example embodiment is configured to receive the order by receiving the order prior to transmission of the order to the designated supplier. In an example embodiment, the system also includes a pending order memory queue configured to at least temporarily store information regarding the order in conjunction with provision of the information to the customer regarding the price of the product at the one or more alternative suppliers. The pending order memory queue of an example embodiment is configured to store information regarding a plurality of orders for a plurality of customers while awaiting the feedback from the respective customers.

The system of an example embodiment also includes a timer configured to determine an elapsed time from provision of the information to the customer regarding the price of the product at the one or more alternative. The processing circuitry of this example embodiment is further configured to cause information regarding the order to be provided via the communication interface to the designated supplier in an instance in which the feedback from the customer is not received within a predefined period of time. In an example embodiment, the processing circuitry is configured to facilitate modification of the order by causing information to be provided via the communication interface that identifies the different supplier selected from among the one or more alternative suppliers to permit the order to be modified. The processing circuitry of an example embodiment is further configured to cause an indication to be provided via the communication interface to hold the order from the designated supplier while awaiting the feedback from the customer. In an example embodiment, the processing circuitry is configured to cause information to be provided via the communication interface to the customer that includes a respective selectable link in conjunction with the information regarding each of the one or more alternative suppliers. The communication interface of this example embodiment is further configured to receive the feedback from the customer in response to selection of the respective selectable link associated with a respective one of the alternative suppliers. The system of an example embodiment also includes a supplier database configured to store information for a plurality of suppliers. The processing circuitry of this example embodiment is configured to identify one or more alternative suppliers by identifying one or more alternative suppliers within a predefined distance of the designated supplier based upon information stored by the supplier database.

In another example embodiment, a method is provided for facilitating selective order modification. The method includes receiving an order identifying a product, a designated supplier from which the order is to be supplied and a price of the product at the designated supplier. The method also includes identifying one or more alternative suppliers and the price of the product at the one or more alternative suppliers. The method further includes providing information to a customer regarding the price of the product at the one or more alternative suppliers. Based on feedback from the customer that identifies a different supplier selected from among the one or more alternative suppliers, the method additionally includes facilitating modification of the order to identify the different supplier selected from among the one or more alternative suppliers instead of the designated supplier.

The method of an example embodiment receives the order by receiving the order prior to transmission of the order to the designated supplier. In an example embodiment, the method also includes at least temporarily storing information regarding the order in a pending order memory queue in conjunction with provision of the information to the customer regarding the price of the product at the one or more alternative suppliers. The method of this example embodiment also includes storing information in the pending order memory queue regarding a plurality of orders for a plurality of customers while awaiting the feedback from the respective customers.

The method of an example embodiment also includes monitoring an elapsed time from provision of the information to the customer regarding the price of the product at the one or more alternative suppliers and providing information regarding the order to the designated supplier in an instance in which the feedback from the customer is not received within a predefined period of time. In an example embodiment, the method also includes storing information for a plurality of suppliers in a supplier database. The method of this example embodiment identifies one or more alternative suppliers by identifying one or more alternative suppliers within a predefined distance of the designated supplier based upon information stored by the supplier database.

The method of an example embodiment facilitates modification of the order by causing information to be provided that identifies the different supplier selected from among the one or more alternative suppliers to permit the order to be modified. The method of an example embodiment also includes causing an indication to be provided to hold the order from the designated supplier while awaiting the feedback from the customer. In an example embodiment, the method includes causing information to be provided to the customer that includes a respective selectable link in conjunction with the information regarding each of the one or more alternative suppliers. The method of this example embodiment also includes receiving the feedback from the customer in response to selection of the respective selectable link associated with a respective one of the alternative suppliers.

In a further example embodiment, a computer program product is provided that is configured to facilitate selective order modification. The computer program product includes at least one non-transitory computer-readable storage medium having computer-executable program code constructions stored therein with the computer-executable program code instructions including program code instructions configured to receive an order identifying a product, a designated supplier from which the order is to be supplied and a price of the product at the designated supplier. The program code instructions are also configured to identify one or more alternative suppliers and the price of the product at the one or more alternative suppliers. The program code instructions are further configured to provide information to a customer regarding the price of the product at the one or more alternative suppliers. Based on feedback from the customer that identifies a different supplier selected from among the one or more alternative suppliers, the program code instructions are additionally configured to facilitate modification of the order to identify the different supplier selected from among the one or more alternative suppliers instead of the designated supplier.

The program code instructions of an example embodiment are configured to receive the order prior to transmission of the order to the designated supplier. In an example embodiment, the program code instructions are further configured to at least temporarily store information regarding the order in a pending order memory queue in conjunction with provision of the information to the customer regarding the price of the product at the one or more alternative suppliers. The program code instructions of this example embodiment are additionally configured to store information in the pending order memory queue regarding a plurality of orders for a plurality of customers while awaiting the feedback from the respective customers.

The program code instructions of an example embodiment are also configured to monitor an elapsed time from provision of the information to the customer regarding the price of the product at the one or more alternative suppliers and to provide information regarding the order to the designated supplier in an instance in which the feedback from the customer is not received within a predefined period of time. In an example embodiment, the program code instructions are also configured to store information for a plurality of suppliers in a supplier database. The program code instructions of this example embodiment that are configured to identify one or more alternative suppliers include program code instructions configured to identify one or more alternative suppliers within a predefined distance of the designated supplier based upon information stored by the supplier database.

The program code instructions that are configured to facilitate modification of the order include, in one embodiment, program code instructions configured to cause information to be provided that identifies the different supplier selected from among the one or more alternative suppliers to permit the order to be modified. The program code instructions of an example embodiment are also configured to cause an indication to be provided to hold the order from the designated supplier while awaiting the feedback from the customer. In an example embodiment, the program code instructions configured to cause information to be provided to the customer include program code instructions configured to cause a respective selectable link to be provided in conjunction with the information regarding each of the one or more alternative suppliers. The program code instructions of this example embodiment are also configured to receive the feedback from the customer in response to selection of the respective selectable link associated with a respective one of the alternative suppliers.

In an example embodiment, a system is provided that is configured to facilitate selective prescription order modification. The system includes a communication interface configured to receive a prescription order identifying a medication, a designated pharmacy at which the prescription order is to be filled and a price of the medication at the designated pharmacy. The system of this example embodiment also includes a pharmacy database configured to store information for a plurality of pharmacies. The system further includes processing circuitry configured to identify one or more alternative pharmacies and the price of the medication at the one or more alternative pharmacies based upon the information stored by the pharmacy database. The processing circuitry is also configured to cause information to be provided via the communication interface to a patient regarding the price of the medication at the one or more alternative pharmacies. In this example embodiment, the system additionally includes a pending order memory queue configured to at least temporarily store information regarding the prescription order in conjunction with provision of the information to the patient regarding the price of the medication at the one or more alternative pharmacies. The processing circuitry is further configured, based on feedback from the patient that identifies a different pharmacy selected from among the one or more alternative pharmacies, to facilitate modification of the prescription order to identify the different pharmacy selected from among the one or more alternative pharmacies instead of the designated pharmacy.

The communication interface of an example embodiment is configured to receive the prescription order by receiving the prescription order prior to transmission of the prescription order to the designated pharmacy. In an example embodiment, the pending order memory queue is configured to store information regarding a plurality of prescription orders for a plurality of patients while awaiting the feedback from the respective patients. The system of an example embodiment also includes a timer configured to determine an elapsed time from provision of the information to the patient regarding the price of the medication at the one or more alternative pharmacies. In this example embodiment, the processing circuitry is further configured to cause information regarding the prescription order to be provided via the communication interface to the designated pharmacy in an instance in which the feedback from the patient is not received within a predefined period of time.

In an example embodiment, another system is provided that is configured to facilitate selective prescription order modification. The system of this example embodiment includes a communication interface configured to receive a prescription order identifying a medication, a designated pharmacy at which the prescription order is to be filled and a price of the medication at the designated pharmacy. The system also includes processing circuitry configured to identify one or more alternative pharmacies and the price of the medication at the one or more alternative pharmacies. The processing circuitry is also configured to cause information to be provided via the communication interface to a patient regarding the price of the medication at the one or more alternative pharmacies. And, the processing circuitry is further configured, based on feedback from the patient that identifies a different pharmacy selected from among the one or more alternative pharmacies, to facilitate modification of the prescription order to identify the different pharmacy selected from among the one or more alternative pharmacies instead of the designated pharmacy.

The communication interface of an example embodiment is configured to receive the prescription order by receiving the prescription order prior to transmission of the prescription order to the designated pharmacy. In an example embodiment, the system also includes a pending order memory queue configured to at least temporarily store information regarding the prescription order in conjunction with provision of the information to the patient regarding the price of the medication at the one or more alternative pharmacies. The pending order memory queue may be configured to store information regarding a plurality of prescription orders for a plurality of patients while awaiting the feedback from the respective patients. The system of an example embodiment also includes a timer configured to determine an elapsed time from provision of the information to the patient regarding the price of the medication at the one or more alternative pharmacies. In this example embodiment, the processing circuitry is further configured to cause information regarding the prescription order to be provided via the communication interface to the designated pharmacy in an instance in which the feedback from the patient is not received within a predefined period of time.

The processing circuitry of an example embodiment is configured to facilitate modification of the prescription order by causing information to be provided via the communication interface that identifies the different pharmacy selected from among the one or more alternative pharmacies to permit the prescription order to be modified. In an example embodiment, the processing circuitry is further configured to cause an indication to be provided via the communication interface to an electronic prescribing system or an electronic health record of a provider to hold the prescription order from the designated pharmacy while awaiting the feedback from the patient. The processing circuitry of an example embodiment is configured to cause information to be provided via the communication interface to the patient that includes a respective selectable link in conjunction with the information regarding each of the one or more alternative pharmacies. The communication interface of this example embodiment may be further configured to receive the feedback from the patient in response to selection of the respective selectable link associated with a respective one of the alternative pharmacies. In an example embodiment, the system also includes a pharmacy database configured to store information for a plurality of pharmacies. The processing circuitry of this example embodiment is configured to identify one or more alternative pharmacies by identifying one or more alternative pharmacies within a predefined distance of the designated pharmacy based upon information stored by the pharmacy database.

In another example embodiment, a method is provided for facilitating selective prescription order modification. The method receives a prescription order identifying a medication, a designated pharmacy at which the prescription order is to be filled and a price of the medication at the designated pharmacy. The method also identifies one or more alternative pharmacies and the price of the medication at the one or more alternative pharmacies. The method additionally causes information to be provided to a patient regarding the price of the medication at the one or more alternative pharmacies. And, the method further includes facilitating, based on feedback from the patient that identifies a different pharmacy selected from among the one or more alternative pharmacies, modification of the prescription order to identify the different pharmacy selected from among the one or more alternative pharmacies instead of the designated pharmacy.

In an example embodiment, receiving the prescription order includes receiving the prescription order prior to transmission of the prescription order to the designated pharmacy. In an example embodiment, the method also includes at least temporarily storing information in a pending order memory queue regarding the prescription order in conjunction with provision of the information to the patient regarding the price of the medication at the one or more alternative pharmacies. In this example embodiment, at least temporarily storing information in the pending order memory queue may include storing information regarding a plurality of prescription orders for a plurality of patients while awaiting the feedback from the respective patients. The method of an example embodiment also includes monitoring an elapsed time from provision of the information to the patient regarding the price of the medication at the one or more alternative pharmacies. In this example embodiment, the method also includes causing information regarding the prescription order to be provided to the designated pharmacy in an instance in which the feedback from the patient is not received within a predefined period of time.

The method of an example embodiment facilitates modification of the prescription order by causing information to be provided via the communication interface that identifies the different pharmacy selected from among the one or more alternative pharmacies to permit the prescription order to be modified. In an example embodiment, the method also includes causing an indication to be provided to an electronic prescribing system or an electronic health record of a provider to hold the prescription order from the designated pharmacy while awaiting the feedback from the patient. The method of an example embodiment causes information to be provided to the patient that includes a respective selectable link in conjunction with the information regarding each of the one or more alternative pharmacies. The method of this example embodiment may also include receiving the feedback from the patient in response to selection of the respective selectable link associated with a respective one of the alternative pharmacies. In an example embodiment, the method also includes storing information for a plurality of pharmacies in a pharmacy database. The method of this example embodiment identifies one or more alternative pharmacies by identifying one or more alternative pharmacies within a predefined distance of the designated pharmacy based upon information stored by the pharmacy database.

In a further example embodiment, a computer program product is provided that is configured to facilitate selective prescription order modification. The computer program product includes at least one non-transitory computer-readable storage medium having computer-executable program code constructions stored therein with the computer-executable program code instructions including program code instructions configured to receive a prescription order identifying a medication, a designated pharmacy at which the prescription order is to be filled and a price of the medication at the designated pharmacy. The program code instructions are also configured to identify one or more alternative pharmacies and the price of the medication at the one or more alternative pharmacies. The program code instructions are additionally configured to cause information to be provided to a patient regarding the price of the medication at the one or more alternative pharmacies. And, the program code instructions are further configured to facilitate, based on feedback from the patient that identifies a different pharmacy selected from among the one or more alternative pharmacies, modification of the prescription order to identify the different pharmacy selected from among the one or more alternative pharmacies instead of the designated pharmacy.

In an example embodiment, the program code instructions are configured to receive the prescription order prior to transmission of the prescription order to the designated pharmacy. In conjunction with provision of the information to the patient regarding the price of the medication at the one or more alternative pharmacies, the program code instructions of an example embodiment are further configured to cause information regarding the prescription order to be at least temporarily stored in a pending order memory queue. In this example embodiment, the program code instructions may be configured to cause information regarding a plurality of prescription orders for a plurality of patients to be at least temporarily stored in the pending order memory queue while awaiting the feedback from the respective patients. The program code instructions of an example embodiment are further configured to monitor an elapsed time from provision of the information to the patient regarding the price of the medication at the one or more alternative pharmacies. In this example embodiment, the program code instructions are further configured to cause information regarding the prescription order to be provided to the designated pharmacy in an instance in which the feedback from the patient is not received within a predefined period of time.

The program code instructions configured to facilitate modification of the prescription order include, in one example embodiment, program code instructions configured to cause information to be provided via the communication interface that identifies the different pharmacy selected from among the one or more alternative pharmacies to permit the prescription order to be modified. In an example embodiment, the program code instructions are also configured to cause an indication to be provided to an electronic prescribing system or an electronic health record of a provider to hold the prescription order from the designated pharmacy while awaiting the feedback from the patient. The program code instructions of an example embodiment are configured to cause information to be provided to the patient that includes a respective selectable link in conjunction with the information regarding each of the one or more alternative pharmacies. The program code instructions of this example embodiment may also be configured to receive the feedback from the patient in response to selection of the respective selectable link associated with a respective one of the alternative pharmacies. In an example embodiment, the program code instructions are also configured to cause information for a plurality of pharmacies to be stored in a pharmacy database. The program code instructions configured to identify one or more alternative pharmacies include, in an example embodiment, program code instructions configured to identify one or more alternative pharmacies within a predefined distance of the designated pharmacy based upon information stored by the pharmacy database.

BRIEF DESCRIPTION OF THE DRAWINGS

Figure 1:
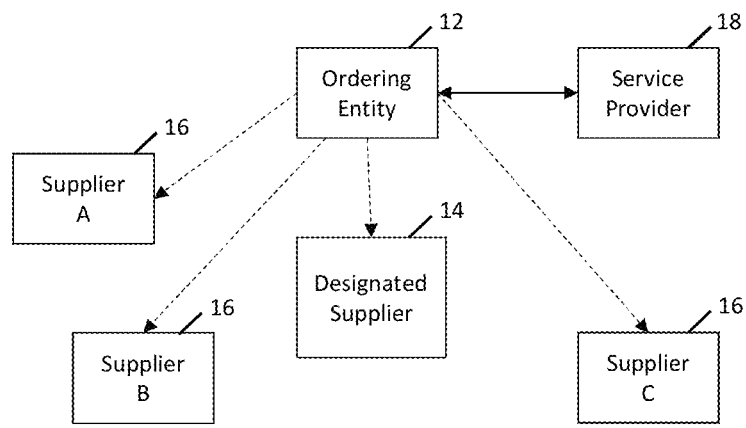
Figure 2:
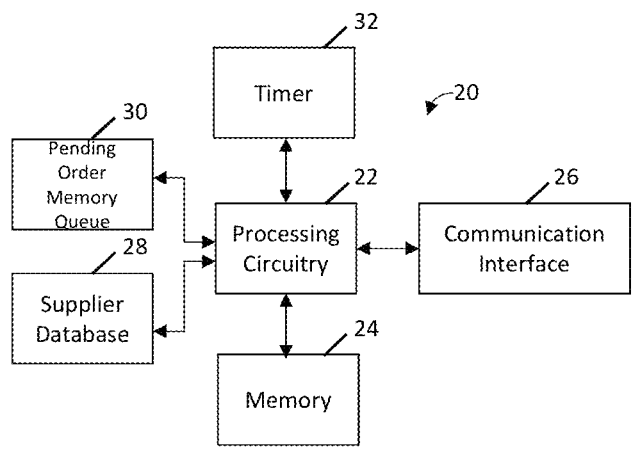
Figure 3:
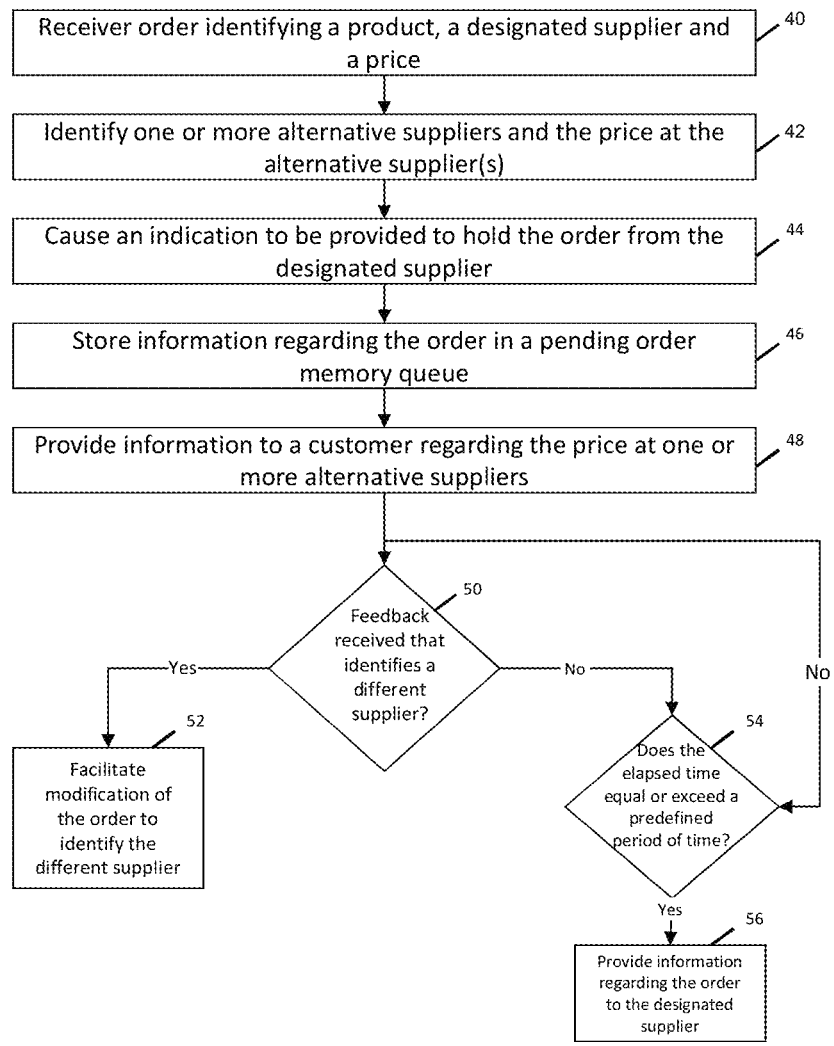
Figure 4:
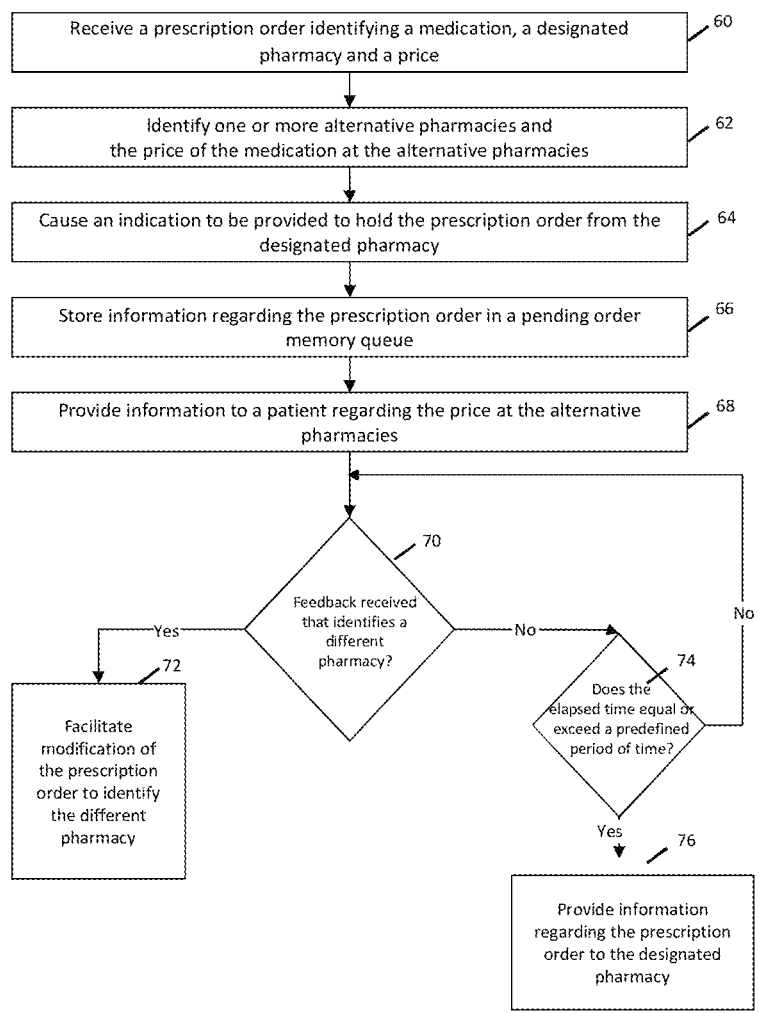
Figure 5A:
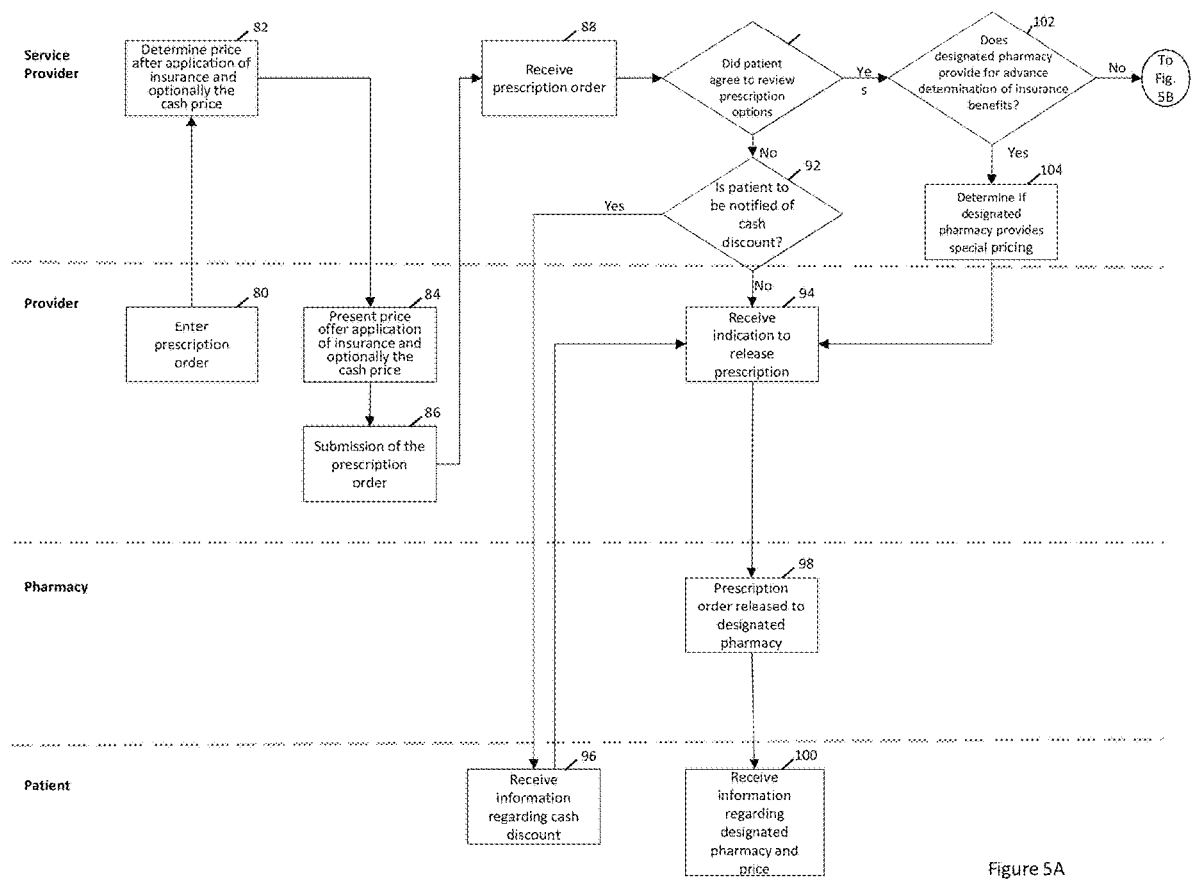
Figure 5B:
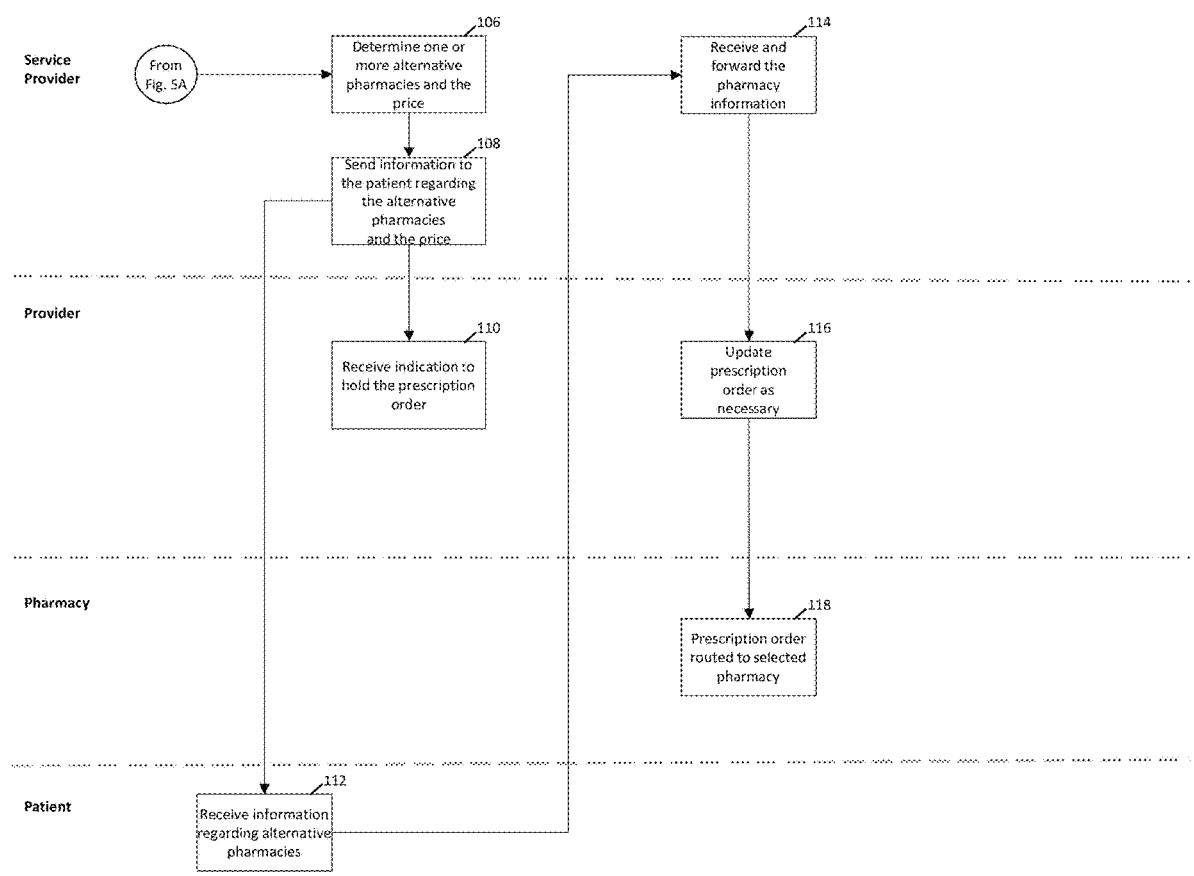

Having thus described certain embodiments of the invention in general terms, reference will now be made to the accompanying drawings, which are not necessarily drawn to scale, and wherein:

FIG. 1 is a block diagram illustrating the relationship of a plurality of entities that interact to facilitate the selective modification of an order, such as the selection of a different supplier, prior to transmission of the order to the supplier that was originally designated in accordance with an example embodiment of the present disclosure;

FIG. 2 is a block diagram of a system for facilitating selective order modification in accordance with an example embodiment of the present disclosure;

FIG. 3 is a flowchart illustrating the operations performed, such as by the system of FIG. 2, in order to facilitate selective order modification in accordance with an example embodiment of the present disclosure;

FIG. 4 is a flowchart illustrating the operations performed, such as by the system of FIG. 2, in order to facilitate prescription order modification in accordance with an example embodiment of the present disclosure;

FIGS. 5A and 5B illustrate a flow diagram of the operations performed by the plurality of entities depicted n FIG. 1 in order to facilitate selective prescription order modification in accordance with an example embodiment of the present disclosure;

FIG. 6A is an example display of a prescription order that is formulated by a provider prior to transmission of the order to a designated supplier; and FIG. 6B is an example display that is presented to a patient to identify the designated pharmacy and a plurality of alternative pharmacies as well as the price of the medication at the plurality of pharmacies to facilitate patient selection of a different pharmacy and subsequent modification of the prescription order in accordance with an example embodiment of the present disclosure.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A system and method are provided to facilitate selective order modification. A variety of different types of orders for a variety of different products may be selectively modified in accordance with various example embodiments. For example, the order that is selectively modified in accordance with an example embodiment may be a prescription order for medication that may be supplied by a pharmacy that is initially designated by the order or by one or more alternative pharmacies. As described below, an order is selectively modified in order to identify a different supplier than the supplier originally designated by the order. The different supplier may be identified for any of various reasons including, for example, offering the same or a functionally equivalent product at a lower price. As such, although orders for any of a variety of products may be selectively modified, the system and method of an example embodiment are configured to selectively modify orders for which one supplier has been originally designated and one or more alternative suppliers offer the same or a functionally equivalent product.

By way of example, FIG. 1 depicts an example embodiment in which an ordering entity 12 formulates an order for a product with the order identifying a designated supplier 14 of the product. The designated supplier may have been identified by the customer as a preferred supplier or may have been identified based upon past behavior or past selections by the customer. Alternatively, the designated supplier may have been identified by the ordering entity, such as based upon a predefined relationship between the ordering entity and the designated supplier or based on past performance of the designated supplier.

As also shown in FIG. 1, the same or a functionally equivalent product may be provided not only by the designated supplier 14, but also by one or more alternative suppliers 16, identified as Supplier A, Supplier B and Supplier C in FIG. 1. FIG. 1 also illustrates a service provider 18 in communication with the ordering entity 12 and configured as described below to provide information regarding the one or more alternative suppliers so as to permit the customer to make an informed decision as to the supplier of the product and, in an instance in which the customer selects a different supplier than the designated supplier 14, to allow for modification of the order to indicate that the order is to be filled by one of the alternative suppliers, as opposed to the designated supplier, prior to transmission of the order to the designated supplier. As such, the customer may then visit the alternative supplier that has been selected in order to obtain the product that is the subject of the order.

By providing for selective modification of the order prior to transmission of the order to the designated supplier 14, the system and method of an example embodiment provide for increased efficiencies. In this regard, the system and method of an example embodiment avoid the exchange of messages between the ordering entity 12 and the designated supplier in instances in which the customer determines that an alternative supplier 26 is to be utilized to supply the product. Thus, the network resources otherwise consumed by the exchange of the messages between the ordering entity and the designated supplier and the computing resources of both the ordering entity and the designated supplier that would otherwise be consumed to receive and process the messages are avoided, thereby increasing the computing efficiency of both the ordering entity and the designated supplier and conserving the network resources otherwise consumed by the exchange of messages.

In accordance with an example embodiment, a system is provided to facilitate the selective modification of an order. An example of the system 20 is depicted in FIG. 2 and, in one embodiment is embodied by the service provider 18 of FIG. 1. The system of the service provider of an example embodiment may, in turn, be embodied by any of variety of different computing devices including, for example, a server, a plurality of networked computing devices, a computer workstation or the like. Regardless of the computing device that embodies the system, the system of the service provider of an example embodiment includes, is associated with or is otherwise in communication with processing circuitry 22, memory 24 and a communication interface 26 as shown, for example, by FIG. 2.

In some embodiments, the processing circuitry 22 (and/or co-processors or any other processors assisting or otherwise associated with the processing circuitry) can be in communication with the memory 24 via a bus for passing information among components of the apparatus 20. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. Alternatively, the processing circuitry can include one or more processors configured in tandem via the bus to enable independent execution of instructions.

In an example embodiment, the processing circuitry 22 can be configured to execute instructions stored in the memory 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, the service provider 12) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26 that can be any means such as a device or circuitry embodied in either hardware or a combination of hardware and software that is configured to receive and/or transmit data from/to other electronic devices in communication with the apparatus, such as a database that stores data generated and/or employed by the processing circuitry 22. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

As described below, the system 20 of FIG. 2 may also include a supplier database 28. The supplier database identifies one or more alternative suppliers of a product as well as the location of each of the one or more alternative suppliers. In an example embodiment, the supplier database identifies the products available fro/m the alternative suppliers such that the alternative suppliers of a product as well as the location of those alternative suppliers may be determined by reference to the supplier database.

The system 20 of FIG. 2 also includes a pending order memory queue 30. As described below, the pending order memory queue maintains records associated with the orders that are under evaluation in order to determine if a customer wishes to select a different supplier than the designated supplier 14 initially identified by the order. The pending order memory queue therefore insures that each order is acted upon with the order being placed either with the designated supplier or with an alternative supplier 16 selected by the customer.

The system 20 of FIG. 1 also includes a timer 32. Although the timer may be separate from and external to the processing circuitry 22, the timer of an example embodiment may be embodied by the processing circuitry. As described below, the timer identifies the length of time for which an order has been under evaluation with respect to the supplier of the product that is the subject of the order. In some embodiments, the timer determines the length of time during which a customer is afforded an opportunity to identify a different supplier of the product as opposed to the designated supplier 14. In instances in which the no alternative supplier is identified within a predefined period of time, the order may be transmitted to the designated supplier to insure fulfillment of the order without further delay while awaiting feedback from the customer.

Referring now to FIG. 3, the operations performed, such as by the system 20 of FIG. 2, in accordance with an example embodiment are depicted. As shown in block 40, the system includes means, such as the processing circuitry 22, the communication interface 26 or the like, configured to receive an order for a product. In addition to identifying the product, the order identifies a designated supplier 14 of the product and a price for the product from the designated supplier. In relation to the overall system depicted in FIG. 1, the order may be constructed and provided by the ordering entity 12 with the resulting order provided to the service provider 18 and, more particularly, to the system of FIG. 2 as embodied by the service provider. In relation to the construction of the order, the ordering entity identifies the designated supplier, such as based upon a prior selection by the customer or in any other manner including those described above relating to inference based upon past customer behavior or preference of the ordering entity. The order formulated by the ordering entity also includes the price for the product as provided by the designated supplier. The price may be defined in various manners including by being based upon information provided by the designated supplier or by a third party, such as in response to an inquiry from the ordering entity, or estimated from the prices associated with prior purchases, such as recent prior purchases, of the same product.

Upon receipt of the order, the system 20, such as the processing circuitry 22, is configured to parse the order so as to separately identify the product, the designated supplier 14 and the price of the product as supplied by the designated supplier. As shown in block 42, the system of this example embodiment also includes means, such as the processing circuitry or the like, configured to identify one or more alternative suppliers 16 of the product as well as the price of the product as supplied by the one or more alternative suppliers. The system, such as the processing circuitry, may be configured to identify the one or more alternative suppliers in any of various manners. In an example embodiment, however, the system also includes a supplier database 28 that identifies one or more suppliers for each of one or more products as well as the price of the respective products from the one or more suppliers. As such, the processing circuitry of an example embodiment is configured to interrogate the supplier database based upon the product that is the subject of the order to identify alternative suppliers of the same product or a functionally equivalent product. For each of the alternative suppliers of the product that are identified, the processing circuitry is configured to interrogate the supplier database to determine the price of the product from each of the alternative suppliers and, in some embodiments, the location of each of the alternative suppliers.

As shown in block 44 of FIG. 3, the system 20 of this example embodiment also includes means, such as the processing circuitry 22, the communication interface 26 or the like, configured to cause an indication to be provided to hold the order from the designated supplier 14. In this regard, the system, such as the processing circuitry, is configured to provide an indication to the ordering entity 12 to hold the order from the designated supplier in an instance in which the system, such as the processing circuitry, is to attempt to identify an alternative supplier 16 for consideration by the customer. Upon receipt of the indication that the order from the designated supplier should be held, the ordering entity is configured to maintain the order for the product from the designated supplier, such as in memory, but to prevent transmission of the order to the designated supplier. By preventing transmission of the order to the designated supplier while consideration is given to the identification and utilization of one or more alternative suppliers, the inefficiencies associated with transmission of the order to the designated supplier and fulfillment of the order by the designated supplier in an instance in which the order is subsequently modified so as to, instead, be directed to an alternative supplier are avoided.

In an instance in which one or more alternative suppliers 16 of the product are identified, the system 20 includes means, such as the processing circuitry 22 or the like, for storing information regarding the order in a pending order memory queue 30. See block 46. The information stored by the pending order memory queue may include a reference number or other identifier that uniquely identifies the order and, in some embodiments one or more of the product that is the subject of the order, the designated supplier 14 and the price of the product from the designated supplier.

As shown in block 48, the system 20 of this example embodiment also includes means, such as a processing circuitry 22, the communication interface 26 or the like, configured to provide information to a customer regarding the one or more alternative suppliers 16 of the product and the price of the product from the one or more alternative suppliers. In addition, the price for the product from the designated supplier 14 may also be provided to the customer for comparison purposes. In some embodiments, information is provided to the customer for each of the alternative suppliers of the product or a functionally equivalent product that have been identified along with the price for the product from the alternative suppliers.

In other embodiments, however, the system 20, such as the processing circuitry 22, is configured to only provide information to the customer regarding the alternative suppliers 16 of the product or a functionally equivalent product that are within a predefined distance of either the customer or of the designated supplier 14, thereby only providing information regarding the closest suppliers of the product. Thus, the supplier database 28 of an example embodiment is configured to also identify the location of the respective suppliers such that the system, such as the processing circuitry, may be configured to determine the distance from the customer to the respective alternative suppliers, such as based upon a distance from an address associated with the customer to the address associated with an alternative supplier, and to determine if the distance is less than the predefined threshold. Alternatively, the system, such as the processing circuitry, may be configured to determine the distance between the designated supplier, such as the address associated with the designated supplier, and the alternative supplier based upon the address of the alternative supplier and to determine if the distance satisfies, e.g., is less than, a predefined threshold.

As shown in block 50 of FIG. 3, the system 20 of an example embodiment also includes means, such as the processing circuitry 22, the communication interface 26 or the like, configured to receive feedback from the customer that identifies, in some instances, a different supplier for the product than the designated supplier 14, such as by identifying one of the alternative suppliers 16. In an instance in which the system receives feedback from the customer identifying a different supplier from among the one or more alternative suppliers, the system includes means, such as the processing circuitry or the like, configured to facilitate modification of the order to identify the different supplier. See block 52. In this regard, the system, such as the processing circuitry, of an example embodiment, is configured to notify the ordering entity 12 of the different supplier that was identified by the customer to fill the order. Based upon this information identifying the different supplier, the ordering entity is configured to modify the order so as to replace the designated supplier with the different supplier identified by the customer and to then forward the order, not to the designated supplier, but to the different supplier that was selected by the customer. This different supplier may then fill the order and the the product that is the subject of the order may then be retrieved by or on behalf of the customer from the different supplier. In this scenario, the order is never transmitted to the designated supplier originally identified by the order, but is held until customer feedback is received that identifies a different supplier to fill the order, thereby avoiding inefficient consumption of computing and network resources that would have occurred if the order had be forwarded to the designated supplier.

In order to insure that each order is acted upon in a timely manner, the system 20 of an example embodiment includes means, such as the processing circuitry 22, the timer 32 or the like, configured to monitor the elapsed time following the provision of information to the customer regarding the one or more alternative suppliers 16 and the price of the product from the one or more alternative suppliers, such as by monitoring the time during which information regarding the order has been stored in the pending order memory queue 30. See block 54 of FIG. 3. In an instance in which the elapsed time has not exceeded a predefined period of time, the system, such as the processing circuitry, is configured to continue to monitor for feedback from the customer identifying the supplier of the product for the order. However, in an instance in which the elapsed time equals or exceeds a predefined period of time, the system includes means, such as the processing circuitry, the communication interface 26 or the like, configured to cause information regarding the order to be provided to the designated supplier. See block 56. In this regard, the system, such as the processing circuitry, the communication interface or the like, may be configured to notify the ordering entity 12 that the customer failed to timely identify an alternative supplier and to instruct the ordering entity to proceed with transmission of the order to the designated supplier 14. The ordering entity may then transmit the order for the product to the designated supplier with the designated supplier subsequently filling the order and awaiting a visit by or on behalf of the customer to retrieve the product.

As noted above, the system 20 and method of an example embodiment may be utilized with respect to a wide variety of different types of orders for a variety of different types of products. One example of a type of order for a product with which the system and method of an example embodiment may be configured to provide for selective modification of the order is a prescription order by which a patient obtains a medication from a pharmacy. In this situation, a provider, that is, a healthcare provider, such as a physician, constructs the prescription order for a medication on behalf of the patient. In some example embodiments, the provider may utilize an electronic health record, a telehealth application or other electronic applications in order to construct the prescription order. As such, the provider and/or the applications, such as the electronic health record, telehealth application, etc., utilized by the provider serve as the ordering entity 12 in the context of FIG. 1.

The prescription order may be constructed so as to indicate not only the medication including the name, dosage and quantity of the medication, but also the designated pharmacy at which the prescription is to be filled. In this regard the patient may have previously indicated the pharmacy from which the patient routinely retrieves his or her prescriptions with that particular pharmacy then serving as the designated pharmacy for subsequent prescriptions for the same patient. However, as described above in conjunction with FIG. 1, prescription orders may alternatively be filled by any of a plurality of other alternative pharmacies. In many instances, a plurality of pharmacies including, for example, the designated pharmacy and one or more alternative pharmacies may offer the medication that is the subject of the prescription order or a medication that is functionally equivalent, such as a generic alternative, to the medication that is the subject of the prescription order. Each of the pharmacies may offer the medication at a price with the price potentially varying from one pharmacy to another, such as an instance in which the medication will be paid for in cash, with a co-pay card and/or utilizing a program offered by the pharmaceutical manufacturer as opposed to an instance in which the patient utilizes insurance to at least partially pay for the medication.

In this example embodiment involving the selective modification of a prescription order, the operations performed by the system 20 are depicted in FIG. 4. As shown in block 60, the system of this example embodiment includes means, such as the processing circuitry 22, communication interface 26 or the like, configured to receive the prescription order identifying a medication, a designated pharmacy and the price of the medication from the designated pharmacy. As noted above, the prescription order may be received from an ordering entity 12, such as a provider or an application, e.g., an electronic health record, a telehealth application, etc., of the provider. The designated pharmacy may be defined in different manners including by being based upon the prior selection by the patient.

As shown in block 62, the system 20 of this example embodiment also includes means, such as the processing circuitry 22, the supplier database 28 or the like, configured to identify one or more alternative pharmacies that can fill the order and the price of the same or a functionally equivalent medication at the alternative pharmacies. In this example embodiment, the supplier database may include information regarding a plurality of pharmacies, information regarding the medications available from each of the plurality of pharmacies and the price of the medications available at the plurality of pharmacies as well as the location of the plurality of pharmacies. As such, the processing circuitry of this example embodiment is configured to interrogate the supplier database based upon the medication that is the subject of the prescription order in order to identify one or more alternative pharmacies from which the same or a functionally equivalent medication is available. For each of the alternative pharmacies that are identified, the price of the medication and the location of the pharmacy may also be identified by the processing circuitry based upon interrogation of the pharmacy database.

During this process of identifying and considering the availability of the medication from one or more alternative pharmacies, the system 20, such as the processing circuitry, 22 communication interface 26 or the like, is configured to cause an indication to be provided to hold the prescription order from the designated pharmacy, such as in an instance in which at least one alternative pharmacy stocks the same or a functionally equivalent medication to that which is the subject of the prescription order. See block 64. The indication may be provided to the ordering entity 12, such as the provider or an application, e.g., an electronic health record, an electronic prescribing system, a telehealth application or the like, utilized by the provider, to trigger or instruct the ordering entity to hold the prescription order such that the prescription order is not transmitted to the designated pharmacy pending further consideration of an alternative pharmacy to potentially supply the medication. By holding the prescription order and preventing transmission of the prescription order to the designated pharmacy, the system and method of an example embodiment provide for improved efficiency by reducing or eliminating the exchange of messages between the provider and the designated pharmacy originally identified by the prescription order, thereby conserving computing and network resources. Moreover, the system and method of an example embodiment increase the efficiency with which a pharmacy operates by reducing or eliminating instances in which a pharmacy that is initially designated by a prescription order fills the prescription order and holds the filled prescription order awaiting a visit from the patient, only to eventually have to restock the medication in an instance in which the patient has identified a different pharmacy to provide the same or a functionally equivalent product, such as at a lower price.

As shown in block 66, the system 20 of this example embodiment may also include means, such as the processing circuitry 22, the pending order memory queue 30 or the like, configured to store information regarding the prescription order in the pending order memory queue. The information stored in the pending order memory queue identifies the prescription order, such as based upon an identifier or other designation associated with the prescription order, and, in some embodiments, the time associated with the prescription order, such as the time at which the prescription order was written by the provider, the time at which prescription order was received by the system of this example embodiment, the time at which information regarding the prescription order was stored in the pending order memory queue or the like. In embodiments in which the system and method of example embodiment concurrently process a plurality of prescription orders, such as a plurality of prescription orders from a plurality of providers for a plurality of patients and a plurality of different types of medication, the pending order memory queue is configured to store information regarding the plurality of prescription orders while the plurality of prescription orders are evaluated to determine the availability of an alternative pharmacy. By storing the information regarding a prescription order in the pending order memory queue, the system and method of an example embodiment are capable of ensuring that the prescription order is evaluated in a timely manner with respect to the availability of an alternative pharmacy, such as described below.

As shown in block 68, the system 20 of this example embodiment also includes means, such as the processing circuitry 22, the communication interface 26 or the like, configured to provide information to a patient regarding the one or more alternative pharmacies that have been identified for the medication or a functionally equivalent medication as well as the price of the medication at each of the alternative pharmacies. In this regard, the system, such the processing circuitry, may be configured to provide the information to the patient for each of the alternative pharmacies that have been identified. Alternatively, the system, such as the processing circuitry, may be configured to provide the information to the patient only for those alternative pharmacies that have been identified and that are within a predefined distance. The predefined distance may be defined in various manners, such as by being within a predefined distance of either the patient or the designated pharmacy. In this example embodiment, information is therefore provided regarding the alternative pharmacies that are capable of filling the prescription order and that are closest, such as the closest to the patient or the designated pharmacy. Thus, the supplier database 28 of an example embodiment is configured to also identify the location of the respective pharmacies such that the system, such as the processing circuitry, is capable of determining the distance from the patient to the respective alternative pharmacies, such as based upon a distance from an address associated with the patient to the address associated with an alternative pharmacy, and to determine if the distance is less than a predefined threshold. Alternatively, the system, such as the processing circuitry, may be configured to determine the distance between the designated pharmacy and an alternative pharmacy based upon the addresses of the designated pharmacy and the alternative pharmacy and to determine if the distance satisfies, e.g., is less than, a predefined threshold.

The system 20 of this example embodiment includes means, such as the processing circuitry 22, the communication interface 26 or the like, configured to receive feedback from the patient that identifies a different pharmacy. See, for example, block 70 of FIG. 4. In this regard, the feedback that is received may indicate that the patient prefers to fill the prescription order at a different pharmacy then the designated pharmacy, such as at one of the alternative pharmacies that have been identified. This selection of a different pharmacy by the patient may be based on any of a variety of different reasons, such as the price of the medication at the different pharmacy, such as in an instance in which the different pharmacy offers the same or a functionally equivalent medication as the designated pharmacy but at a lower price, particularly in an instance in which the patient pays for the medication without reliance upon insurance coverage, such as by paying cash for the medication and/or by utilizing a co-pay card (with which a pharmaceutical manufacturer subsidizes the cost of a medication) or relying upon another program offered by a pharmaceutical manufacturer. As used herein, reference to cash and/or the cash price for a medication more generally includes the price for the medication in an instance in which the medication is paid for without reliance upon insurance coverage regardless of whether the medication is paid for with cash, but utilizing a co-pay card or by relying upon another program offered by a pharmaceutical manufacturer.

In an instance in which feedback is received that identifies a different pharmacy for the prescription order, the system 20 of this example embodiment includes means, such as the processing circuitry 22, the communication interface 24 or the like, configured to facilitate modification of the prescription order so as to identify the different pharmacy. See block 72. In this regard, the system, such as the processing circuitry, the communication interface or the like, may be configured to provide an identification to the ordering entity 12, such as the provider or an electronic health record, a telehealth application or other application utilized by the provider, of the different pharmacy that the patient selected to provide the medication in conjunction a respective prescription order. The provider or an application, e.g., an electronic health record, of the provider then modifies the prescription order, such as by replacing the indication of the designated pharmacy with an indication of the different pharmacy prior to transmitting the prescription order to the different pharmacy to be filled and subsequently picked up by or on behalf of the patient.

Alternatively, in an instance in which feedback is not received from the patient that identifies any different pharmacy to fill the prescription order and/or in which the feedback that is received from the patient indicates that the designated pharmacy should still be utilized to fill prescription, the provider, such as an electronic prescribing system or an electronic health record of the provider, should be alerted that the hold of the prescription order should be lifted and that the prescription order should be transmitted to the designated pharmacy to be filled for subsequent pick up by or on behalf of the patient. In order to ensure a timely consideration of the prescription order and the pharmacy that will fill the prescription order, the system 20 of an example embodiment includes means, such as the processing circuitry 22, the timer 32 or the like, configured to determine whether an elapsed time equals or exceeds a predefined period of time. See block 74. In this regard, the elapsed time may be defined to be the time that has elapsed from the time at which a particular action was taken with regard to the prescription order, such as the time at which information regarding the prescription order was stored in the pending order memory queue 30, the time at which the prescription order was received from the provider, the time at which the prescription order was written by the provider or the like, until the earlier of the present time or the time at which feedback is received from the patient. In an embodiment in which the system includes a timer, the timer is configured to measure the elapsed time, while in other embodiments the processing circuitry may be configured to monitor the elapsed time.

In an instance in which the system 20, such as the processing circuitry 22, determines that the elapsed time is less than the predefined period of time, the system, such as the processing circuitry, is configured to continue to monitor for feedback from the patient as shown in block 70 of FIG. 4. Alternatively, in an instance in which the system, such as the processing circuitry, determines, that the elapsed time equals or exceeds the predefined period of time, the system includes means, such as processing circuitry, the communication interface 26 or the like, configured to cause information regarding the prescription order to be provided to the designated pharmacy. See block 76. In this situation, the system, such as the processing circuitry, the communication interface or the like, is configured to provide an indication to the provider, such as an electronic health record or an electronic prescribing system utilized by the provider, advising that the hold of the prescription order should be lifted and that the prescription order should be transmitted to the designated pharmacy to be filled and picked up by or on behalf of the patient. By filling the prescription order at the designated pharmacy in an instance in which the patient does not provide timely feedback, the system and method of an example embodiment ensure that the prescription order is filled and is available to the patient in a timely manner, while still providing the patient with an opportunity to select an alternative pharmacy, if so desired.

By way of further explanation, FIGS. 5A and 5B depict the operations performed by a plurality of different entities, such as a patient, a pharmacy, e.g., the designated pharmacy or an alternative pharmacy, a provider and a service provider 18, in relation to the evaluation of alternative pharmacies in conjunction with filling a prescription order. In this regard, the provider initially enters a prescription order, such via an electronic health record or telehealth application, as shown in block 80.

As shown in block 82 of FIG. 5A, the service provider 18, such as the system 20 and, more particularly, the processing circuitry 22, the communication interface 26 or the like, receives the prescription order from the provider and is configured to determine the price of the medication following the application of insurance benefits of the patient and, in some embodiments the price of the medication if the patient were to alternatively pay for the medication without reliance upon insurance coverage, such as by paying cash for the medication and/or by utilizing a co-pay card or relying upon another program offered by a pharmaceutical manufacturer. The service provider, such as the system and, more particularly the processing circuitry, may be configured to determine the price of the medication in various manners, but, in one embodiment, is configured to determine the price of the medication following the application of insurance by use of a real-time benefit check service that is configured to provide information regarding the price of medication for a particular patient following application of insurance benefits. By interacting with a payor, such as an insurance company or other third party, a real-time benefit check service is capable of determining the price of the medication following application of the patient's insurance benefits in an accurate manner. In some embodiments, the system, such as the processing circuitry, is also configured to identify the price of the medication in an instance in which cash is utilized to pay for the medication or in which the medication is otherwise paid for without reliance upon insurance coverage, such as based upon information provided by the designated pharmacy as to the cash price of the medication.

As shown in blocks 84 and 86, the information regarding the price of the medication following the application of insurance benefits and optionally the cash price for the same medication may be provided to the provider and the provider may elect to submit the prescription order to the service provider 18 following presentation and consideration of the price of the medication and, in some embodiments in which the prescription order is formulated during a patient visit, following consultation with the patient. As shown, for example, in FIG. 6A, the prescription order that is submitted may identify the medication, e.g., Apreretin 200 MG tablets, and, in some embodiments, one or more functionally equivalent medications, e.g., Abafribrate 100 MG tablets and Alfuxime 400 MG tablets. The prescription order of FIG. 6A also identifies the designated pharmacy and the price of the medication and, in some embodiments, the price of one or more functionally equivalent medications, such as based upon information provided by the service provider as described above.

As shown in blocks 88 and 90, the service provider 18, such as the system 20 and, more particularly the processing circuitry 22, the communication interface 26 or the like, receives the prescription order and, in one embodiment, determines whether the patient has agreed to review prescription options, such as to consider alternative pharmacies to fill the prescription order. This determination may be made based upon information provided via the prescription order, such as in an instance in which the provider checks the box in the prescription order of FIG. 6A indicating that the patient has consented to review prescription options. In an instance in which the patient has not consented to review prescription options, the system, such as the processing circuitry or the like, of this example embodiment is configured to determine whether the patient is to be notified of a cash discount, that is, a reduction in the price of the medication offered in an instance in which the patient pays cash for the medication or otherwise pays for the medication without reliance upon insurance coverage, as opposed to relying upon insurance for payment or at least partial payment for the medication. This determination may be made based upon information stored by or accessible by the service provider regarding the patient.

In an instance in which the patient is to be notified of cash discount, the service provider 18 and, more particularly the system 20, such as the processing circuitry 22, the communication interface 26 or the like, is configured to provide information to the patient as shown in block 96 regarding the discount for cash payment, such as based upon the information previously provided, such as described above in conjunction with block 82. The patient may then provide feedback to the provider indicating that the prescription order should be released to the designated pharmacy and, in some embodiments, by additionally providing information as to whether the patient plans to pay for the medication at the designated pharmacy without relying on insurance coverage, such as by paying with cash, or by reliance upon insurance. In response to receiving the feedback from the patient regarding the release of the prescription order or, alternatively, in an instance in which the patient has not consented to be notified of a cash discount, the service provider, such as the system and, more particularly the processing circuitry, the communication interface or the like, is configured to provide an indication to the provider to release the prescription order to the designated pharmacy. See block 94. The designated pharmacy then receives the prescription order and fills the prescription order while awaiting pick up on or behalf of the patient. See block 98. In some embodiments, the patient is also provided with information at this stage regarding the designated pharmacy, such as the name and/or location of designated pharmacy, and the price of the medication including, for example, an indication as to whether the patient is anticipated to pay for the medication utilizing their insurance or whether the patient is anticipated to pay for the medication without reliance upon insurance coverage, such as by paying with cash. See block 100.

In an instance in which the patient has consented to review prescription options, such as the availability and price of the medication at one or more alternative pharmacies, the service provider 18, such as the system 20, and more particularly, the processing circuitry 22 may be configured to determine whether the designated pharmacy provides for the advanced determination of the insurance benefits to be available to the patient, such as via a real-time benefit check service. See block 102. This determination may be made based upon information stored by or accessible by the service provider regarding the designated pharmacy. In an instance in which the designated pharmacy does provide for the advanced determination of insurance benefits, such as the anticipated price to the patient for the medication an instance in which the patient utilizes, at least in part, insurance to pay for the medication, the service provider, such as they system and, more particularly, the processing circuitry may optionally be configured to determine whether the pharmacy, that is, the designated pharmacy provides special pricing. See block 104. A variety of different types of special pricing may be provided. In some embodiments a rebate may be provided to a prescription benefit manager in an instance in which the prescription order is filled by the pharmacy with payment for the prescription provided at least in part by the insurance of the patient. In this instance, some pharmacies may permit the patient to pay for the medication in cash with the price of the medication of being reduced by the amount of the rebate which otherwise would have been paid to the prescription benefit manager if insurance had been utilized to at least partially pay for the medication.

Following this determination, the provider may be notified to release the prescription order to the designated pharmacy, and, in an instance in which the designated pharmacy is determined to provide special pricing, the provider and, in turn, the designated pharmacy is alerted that the price for the medication should take into account the special pricing provided by the designated pharmacy. See block 94. The prescription order may then be transmitted to and filled by the designated pharmacy and, in some embodiments the patient may receive information regarding the availability of the filled prescription order at a designated pharmacy as well as the price for the medication taking into account, for example, any special pricing. See blocks 98 and 100.

In an instance in which the patient has consented to review prescription options, such as the availability of alternatives pharmacies for a prescription order, and in an instance in which the designated pharmacy does not provide for advanced determination of insurance benefits such as via a real-time benefit check service, the service provider 18, such as the system 20 and, more particularly, the processing circuitry 22, is configured to determine one or more alternative pharmacies that capable of filling the prescription order for the medication or a functionally equivalent medication as well as the price of the medication at the alternative pharmacies, such as in manner described above in relation to block 62 of FIG. 4. See block 106 of FIG. 5B. Following the determination of one or more alternative pharmacies, the service provider, such as the system and, more particularly, the processing circuitry, the communication interface 26 or the like, is configured to provide information to the patient regarding the one more alternative pharmacies that have been identified as well as the price of the medication at the alternative pharmacies. See block 108. In this regard, information regarding all of the alternative pharmacies that have been identified may be provided to the patient or, in some embodiments, information may only be provided to the patient regarding the one or more alternative pharmacies that are within a predefined distance of the designated pharmacy or the patient or the patient.

Concurrent with the provision of information to the patient regarding the one or more alternative pharmacies, the service provider 18, such as the system 20 and, more particularly, the processing circuitry 22, the communication interface 26 or the like, is configured to provide an indication to an electronic prescribing system or an electronic health record of the provider to hold the prescription and to avoid transmission of the prescription order to the designated pharmacy. See block 110. By at least temporarily preventing the transmission of the prescription order to the designated pharmacy, the system and method of an example embodiment provide for the more efficient processing of the prescription order by avoiding the inefficient consumption of computing and network resources that would have occurred if the prescription order had be forwarded to the designated supplier only to have the patient subsequently select an alternative pharmacy to file the prescription order.

As shown in block 112 of FIG. 5B, the patient receives information regarding the alternative pharmacies. Although the information may be presented in various manners, FIG. 6B depicts one example of a display that may be presented via a user interface of computing device of the patient to provide information regarding the alternative pharmacies (identified as Pharmacies A, B and C in FIG. 6B), the locations of the alternative pharmacies and the distances to the alternative pharmacies as well as the price of the medication, such as the cash price of the medication, at the alternative pharmacies. As shown in FIG. 6B, information regarding the designated pharmacy, such as the location of the designated pharmacy, the distance to the designated pharmacy and the price of the medication at the designated pharmacy, may also be provided, such as for comparison purposes.

In the example embodiment depicted in FIG. 5B, the patient provides feedback regarding the selection of a pharmacy. The selection may be confirmation of the designated pharmacy or the selection of a different pharmacy, such as one of the alternative pharmacies that have been identified. Although this feedback may be provided in various different manners, the information that is provided to the patient in one example embodiment may include selectable links, e.g., Uniform Resource Locators (URLs), for each of the pharmacies, that is, the designated pharmacy and the one or more alternative pharmacies. As such, the patient of this example embodiment may select a respective link associated with a respective pharmacy in order to provide feedback selecting the respective pharmacy. The service provider 18, such as the system 20 and, more particularly, the processing circuitry 22, the communication interface 26 or the like, is configured to receive the selection of the pharmacy from the patient and, in an instance in which a different pharmacy has been selected, the service provider, such as the system and, more particularly, the processing circuitry, the communication interface or the like, is configured to provide an indication to the provider requesting the provider to update the prescription order as necessary, such as to change the pharmacy that will fill the prescription order from the designated pharmacy that was initially identified to the different pharmacy selected by the patient. See block 114. Alternatively, in an instance in which the patient fails to provide feedback in a timely manner or in which the feedback from the patient confirms that the prescription order should be filled by the designated pharmacy, the service provider, such as the system and, more particularly, the processing circuitry, the communication interface or the like, is similarly configured to provide an indication to the provider requesting the provider process the prescription order as formulated including use of the designated pharmacy that was initially identified.

After the provider, such as an electronic health record of the provider, has updated the prescription order, the prescription order is routed to the selected pharmacy, such as the designated pharmacy in an instance in which the patient did not provide feedback in a timely manner or in which the patient confirmed selection of the designated pharmacy or a different pharmacy, such as in an instance in which the feedback provided by the patient selected one of the alternative pharmacies. See blocks 116 and 118 of FIG. 5B. The prescription order may then be filled by the pharmacy prior to pick up by or on behalf of the patient.

As described above, a system 20 and method are therefore provided to facilitate modification of an order, such as a prescription order, including the selection of a different supplier than the supplier originally designated to fill the order. In this regard, the system and method of an example embodiment provide for modification of the order including selection of a different supplier prior to transmission of the order to the supplier that is originally designated. Thus, the system and method of an example embodiment provide for the fulfillment of an order in a more efficient manner by reducing or eliminating the exchange of messages between the ordering entity 18 formulating and placing the order and the originally designated supplier 14, thereby conserving computing and network resources. Moreover, the system and method of an example embodiment increase the efficiency with which a supplier operates by reducing or eliminating instances in which a supplier that is initially designated by an order fills the order and holds the filled order awaiting pick up by or on behalf of the customer, only to eventually have to restock the product in an instance in which the customer has identified a different supplier for the same or a functionally equivalent product.

As noted above, FIGS. 3, 4, 5A and 5B are flowcharts illustrating the operations performed by a system, method and computer program product, such as system 20 of FIG. 2, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of a computing device employing an embodiment of the present invention and executed by a processing circuitry 22 of the system. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3, 4, 5A and 5B, when executed, convert a computer or processing circuitry into a particular machine configured to perform an example embodiment of the present invention. Accordingly, the operations of FIGS. 3, 4, 5A and 5B define an algorithm for configuring a computer or processing circuitry, e.g., processor, to perform an example embodiment. In some cases, a general purpose computer may be provided with an instance of the processor which performs the algorithm of FIGS. 3, 4, 5A and 5B to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system configured to facilitate selective order modification for a plurality of orders received from a plurality of healthcare provider computers operative in a network, the system comprising:
    a communication interface configured to receive an order from a healthcare provider computer identifying a prescription drug, a designated supplier from which the product is to be supplied and a price of the prescription drug at the designated supplier;
    a supplier database configured to store information for a plurality of suppliers;
    processing circuitry configured to identify one or more alternative suppliers and the price of the prescription drug at the one or more alternative suppliers based upon the information stored by the supplier database, and to cause information to be provided via the communication interface to a customer device, remote from the healthcare provider computer, regarding the price of the prescription drug at the one or more alternative suppliers; and
    a pending order memory queue configured to at least temporarily store information regarding the order in conjunction with provision of the information to the customer device regarding the price of the prescription drug at the one or more alternative suppliers,
    wherein the processing circuitry is further configured to:
        monitor an elapsed time from provision of the information to the customer device regarding the price of the prescription drug at the one or more alternative suppliers;
        in an instance in which the feedback from the customer device is not received within a predefined period of time, provide information regarding the order to the designated supplier; and
        in an instance in which the feedback from the customer device is received within a predefined period of time and identifies a different supplier selected from among the one or more alternative suppliers, facilitate modification of the order to identify the different supplier selected from among the one or more alternative suppliers instead of the designated supplier.

2. A system according to claim 1 wherein the communication interface is configured to receive the order by receiving the order prior to transmission of the order to the designated supplier.

3. A system according to claim 1 wherein the pending order memory queue is configured to store information regarding a plurality of orders for a plurality of customers while awaiting the feedback from the respective customers.

4. A system configured to facilitate selective order modification for a plurality of orders received from a plurality of healthcare provider computers operative in a network, the system comprising:
    a communication interface configured to receive an order from a healthcare provider computer identifying a prescription drug, a designated supplier from which the order is to be supplied and a price of the prescription drug at the designated supplier; and
    processing circuitry configured to:
        identify one or more alternative suppliers and the price of the prescription drug at the one or more alternative suppliers, to cause information to be provided via the communication interface to a customer device, remote from the healthcare provider computer, regarding the price of the prescription drug at the one or more alternative suppliers,
        monitor an elapsed time from provision of the information to the customer device regarding the price of the prescription drug at the one or more alternative suppliers,
        in an instance in which the feedback from the customer device is not received within a predefined period of time, provide information regarding the order to the designated supplier, and
        in an instance in which the feedback from the customer device is received within a predefined period of time and identifies a different supplier selected from among the one or more alternative suppliers, atoll facilitate modification of the order to identify the different supplier selected from among the one or more alternative suppliers instead of the designated supplier.

5. A system according to claim 4 wherein the communication interface is configured to receive the order by receiving the order prior to transmission of the order to the designated supplier.

6. A system according to claim 4 further comprising a pending order memory queue configured to at least temporarily store information regarding the order in conjunction with provision of the information to the customer device regarding the price of the prescription drug at the one or more alternative suppliers.

7. A system according to claim 6 wherein the pending order memory queue is configured to store information regarding a plurality of orders for a plurality of customers while awaiting the feedback from the respective customers.

8. A system according to claim 4 wherein the processing circuitry is configured to facilitate modification of the order by causing information to be provided via the communication interface that identifies the different supplier selected from among the one or more alternative suppliers to permit the order to be modified.

9. A system according to claim 4 wherein the processing circuitry is further configured to cause an indication to be provided via the communication interface to hold the order from the designated supplier while awaiting the feedback from the customer device.

10. A system according to claim 4 wherein the processing circuitry is configured to cause information to be provided via the communication interface to the customer device that includes a respective selectable link in conjunction with the information regarding each of the one or more alternative suppliers.

11. A system according to claim 10 wherein the communication interface is further configured to receive the feedback from the customer device in response to selection of the respective selectable link associated with a respective one of the alternative suppliers.

12. A system according to claim 4 further comprising a supplier database configured to store information for a plurality of suppliers, wherein the processing circuitry is configured to identify one or more alternative suppliers by identifying one or more alternative suppliers within a predefined distance of the designated supplier based upon information stored by the supplier database.

13. A method for facilitating selective order modification for a plurality of orders received from a plurality of healthcare provider computers operative in a network, the method comprising:
receiving an order from a healthcare provider computer identifying a prescription drug, a designated supplier from which the order is to be supplied and a price of the prescription drug at the designated supplier;
identifying one or more alternative suppliers and the price of the prescription drug at the one or more alternative suppliers;
providing information to a customer device, remote from the healthcare provider computer, regarding the price of the prescription drug at the one or more alternative suppliers;
monitoring, by at least a processor, an elapsed time from provision of the information to the customer device regarding the price of the prescription drug at the one or more alternative suppliers;
in an instance in which the feedback from the customer device is not received within a predefined period of time, providing information regarding the order to the designated supplier; and
in an instance in which the feedback from the customer device is received within a predefined period of time and identifies a different supplier selected from among the one or more alternative suppliers, facilitating modification of the order to identify the different supplier selected from among the one or more alternative suppliers instead of the designated supplier.

14. A method according to claim 13 wherein receiving the order comprises receiving the order prior to transmission of the order to the designated supplier.

15. A method according to claim 13 further comprising at least temporarily storing information regarding the order in a pending order memory queue in conjunction with provision of the information to the customer device regarding the price of the prescription drug at the one or more alternative suppliers.

16. A method according to claim 15 further comprising storing information in the pending order memory queue regarding a plurality of orders for a plurality of customers while awaiting the feedback from the respective customers.

17. A method according to claim 13 further comprising storing information for a plurality of suppliers in a supplier database, wherein identifying one or more alternative suppliers comprises identifying one or more alternative suppliers within a predefined distance of the designated supplier based upon information stored by the supplier database.

\* \* \* \* \*

UNITED STATES PATENT AND TRADEMARK OFFICE
CERTIFICATE OF CORRECTION

| | | |
|---|---|---|
| PATENT NO. | : 11,501,359 B1 | Page 1 of 1 |
| APPLICATION NO. | : 16/945408 | |
| DATED | : November 15, 2022 | |
| INVENTOR(S) | : Lorenz et al. | |

It is certified that error appears in the above-identified patent and that said Letters Patent is hereby corrected as shown below:

In the Claims

Column 26,
Line 49, "alternative suppliers, atoll" should read --alternative suppliers,--.

Signed and Sealed this
Third Day of October, 2023

Katherine Kelly Vidal
*Director of the United States Patent and Trademark Office*